(12) United States Patent
Green et al.

(10) Patent No.: US 7,620,294 B2
(45) Date of Patent: **\*Nov. 17, 2009**

(54) SYSTEMS AND METHODS FOR PLAYING DIGITAL VIDEO IN REVERSE AND FAST FORWARD MODES

(75) Inventors: Dustin L. Green, Mountain View, CA (US); Peter J. Barrett, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 803 days.

This patent is subject to a terminal disclaimer.

(21) Appl. No.: 11/198,500

(22) Filed: Aug. 5, 2005

(65) Prior Publication Data
US 2005/0265694 A1    Dec. 1, 2005

Related U.S. Application Data

(63) Continuation of application No. 09/858,065, filed on May 14, 2001, now Pat. No. 6,970,640.

(51) Int. Cl.
*H04N 5/782* (2006.01)
*H04N 7/173* (2006.01)

(52) U.S. Cl. .................. 386/68; 386/6; 386/7; 386/8; 386/81; 386/82; 386/111; 386/96; 386/125; 386/126; 725/88; 725/89; 725/90; 725/102

(58) Field of Classification Search ................... 386/95, 386/96, 46, 68, 111, 81, 82, 6, 7, 8; 725/94, 725/141, 153
See application file for complete search history.

(56) References Cited

U.S. PATENT DOCUMENTS 5,815,636 A * 9/1998 Fujii et al. ................... 386/116
6,473,558 B1 * 10/2002 Wu et al. ...................... 386/68
6,801,710 B1 * 10/2004 Halfant ........................ 386/68
6,865,747 B1 * 3/2005 Mercier ....................... 725/94
6,871,006 B1 * 3/2005 Oguz et al. ................... 386/68
7,164,844 B1 * 1/2007 Yap et al. ..................... 386/68

(Continued)

OTHER PUBLICATIONS

Office Action dated May 23, 2005 cited in U.S. Appl. No. 09/858,065.

(Continued)

*Primary Examiner*—Thai Tran
*Assistant Examiner*—Jamie J Vent Atala
(74) *Attorney, Agent, or Firm*—Workman Nydegger (57) ABSTRACT

Replaying a compressed digital video stream in fast-forward and reverse modes at varied playback rates. An index of intercoded frames, those frames not dependant on other frames for generation, is stored. The index includes the size of interceded frames and their storage location. When a specified playback rate is requested, the interceded frames are retrieved using the index. The interceded frames then have one or more intracoded frames, frames that reference other frames for generation, placed between them to generate a frame sequence. The intracoded frames are "blank," meaning they contain only information from their associated intercoded frame. By inserting "blank" frames specified playback rates and bit rates are generated. The index of interceded frames may also be accessed to generate playback in reverse mode, which conserves memory resources of associated systems by generating the reverse playback stream in an iterative manner.

16 Claims, 8 Drawing Sheets

U.S. PATENT DOCUMENTS

2003/0231863 A1  12/2003  Eerenberg
2004/0067043 A1  4/2004   Duruoz
2005/0025456 A1* 2/2005   Halfant ........................ 386/68
2006/0029372 A1  2/2006   Barrett et al. ................. 386/68

OTHER PUBLICATIONS

Notice of Allowance dated Jul. 1, 2005 cited in U.S. Appl. No. 09/858,065.

* cited by examiner

SYSTEMS AND METHODS FOR PLAYING DIGITAL VIDEO IN REVERSE AND FAST FORWARD MODES

CROSS-REFERENCE TO RELATED APPLICATIONS

This application is a continuation of application Ser. No. 09/858,065, filed May 14 2001, and entitled "SYSTEMS AND METHODS FOR PLAYING DIGITAL VIDEO IN REVERSE AND FAST FORWARD MODES" and which is incorporated here by reference.

BACKGROUND OF THE INVENTION

1. The Field of the Invention

The present invention relates to the field of digital video. More specifically, the present invention relates to playing stored digital video in reverse and fast-forward modes at various speeds.

2. The Related Art

The ability to record and replay events using video cameras has transformed entertainment and communications. For example, news events, as well as other happenings can be recorded as they occur and then played back later for large numbers of viewers. Home video cassette recorders have also made recording and play back of events available to the consumer market.

More recently, digital video recorders have been developed. Digital video has certain advantages over conventional analog videotape. Digital video can be read and reproduced non-destructively so that the recorded video suffers little or no degradation and can be available long term for other future reproductions. Digital video can also be sent as an electronic mail attachment or posted on Web sites, which is of great benefit considering the ever-increasing number of users on the Internet.

However, one disadvantage of digital video is the amount of storage space it consumes. Even relatively short video clips can use large amounts of disk space or other storage resources. As a result, a variety of digital video compression techniques were developed to reduce these large storage requirements. One such compression technique for digital video is Moving Pictures Experts Group, or MPEG.

MPEG employs interframe encoding, which means some of the frames are used as reference frames for other frames in the video stream. An MPEG stream includes I-frames, P-frames and B-frames. I-frames are independent frames that may be decompressed and reproduced independently without referring to any other frames in the MPEG video stream. P-frames, or "Predictive" frames, are reproduced using the previous I-frame or P-frame. B-frames, or "Bi-directionally predictive" frames, are reproduced using frames previous to and/or subsequent to the B-frame. Since I-frames do not reference other frames for information, I-frames are typically substantially larger in size than P-frames and B-frames.

When playing an MPEG stream, the whole stream is read and all of the frames are displayed in sequence. MPEG is effective because the visual elements that are lost due to the interframe encoding and decoding processes are not perceived by the human eye to any significant extent. Thus, to the human eye, playback of MPEG compressed digital video at conventional speeds appears true to the original moving image.

Figure 1A:
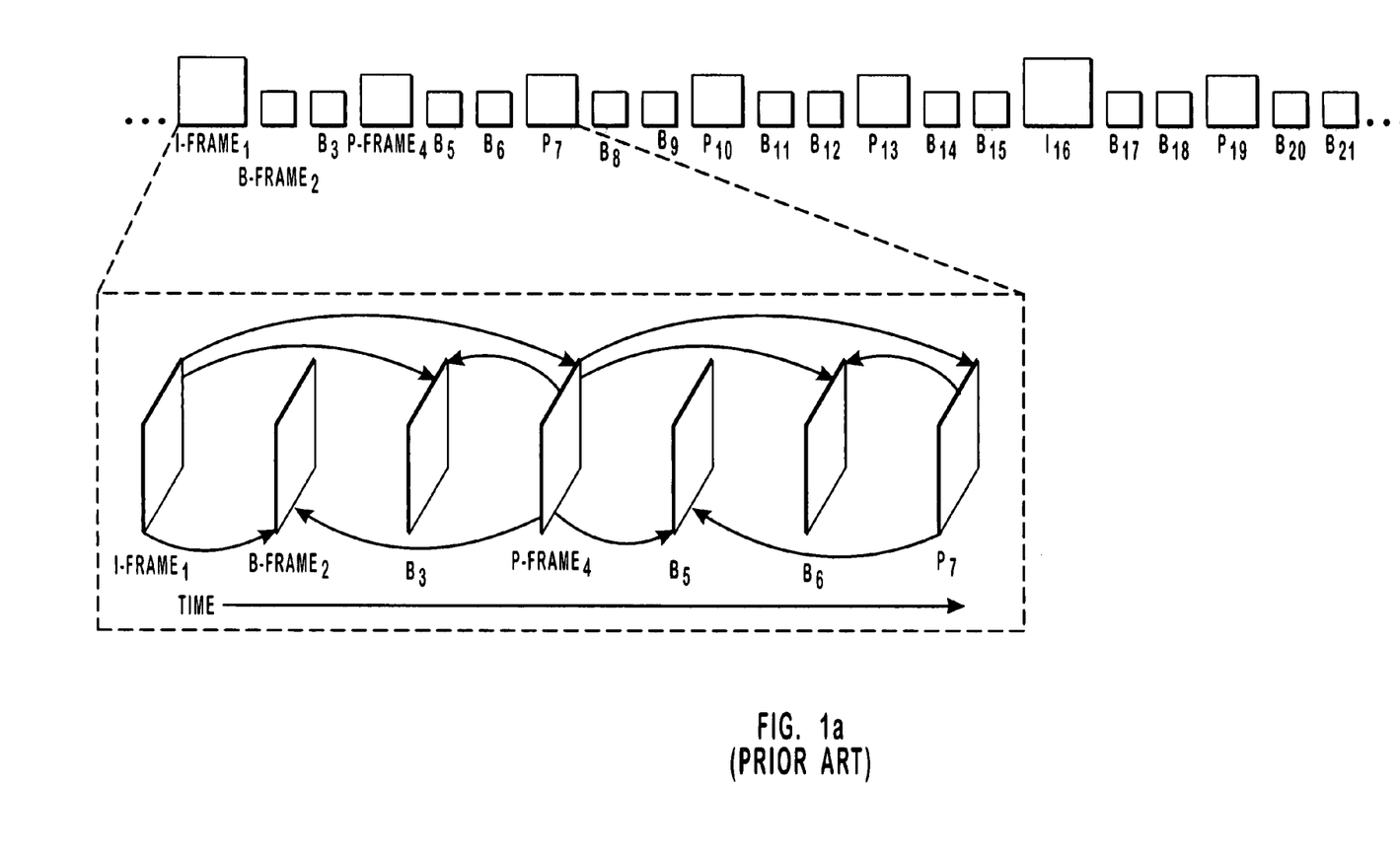
FIG. 1 is a frame sequence diagram, which illustrates how frame sequences are generated for video stream playback in normal and conventional fast-forward modes.

FIG. 1a illustrates a common display-order frame sequence (e.g. IBBPBBPBBPBBPBB) used in MPEG where "I", "P", and "B" respectively represent an I-frame, a P-frame, and a B-frame. In FIG. 1a, I-frame 1 and I-frame 16 are intracoded, meaning that I-frames 1 and 16 are encoded (and decoded) without using information from other frames in the digital video stream. P-frames are non-intracoded, meaning that P-frames are dependent on other frames in the digital video stream.

A P-frame may be encoded (and decoded) using its own data in addition to data from the preceding I-frame or P-frame in the digital video stream. Thus, P-frame 4 would be temporally predicted from I-frame 1; P-frame 7 would be temporally predicted from P-frame 4; P-frame 10 would be temporally predicted from P-frame 7; P-frame 13 would be temporally predicted from P-frame 10; and P-frame 19 would be temporally predicted from I-frame 16.

B-frames in the illustrated frame sequence are also non-intracoded and thus dependent on other frames in the digital video stream. A B-frame may be encoded (and decoded) using its own data the data from the preceding I-frames or P-frames, and the data from the subsequent I-frame or P-frame. By way of example, B-frame 2 may be encoded (and decoded) using information from both I-frame 1 and P-frame 4.

Figure 1B:
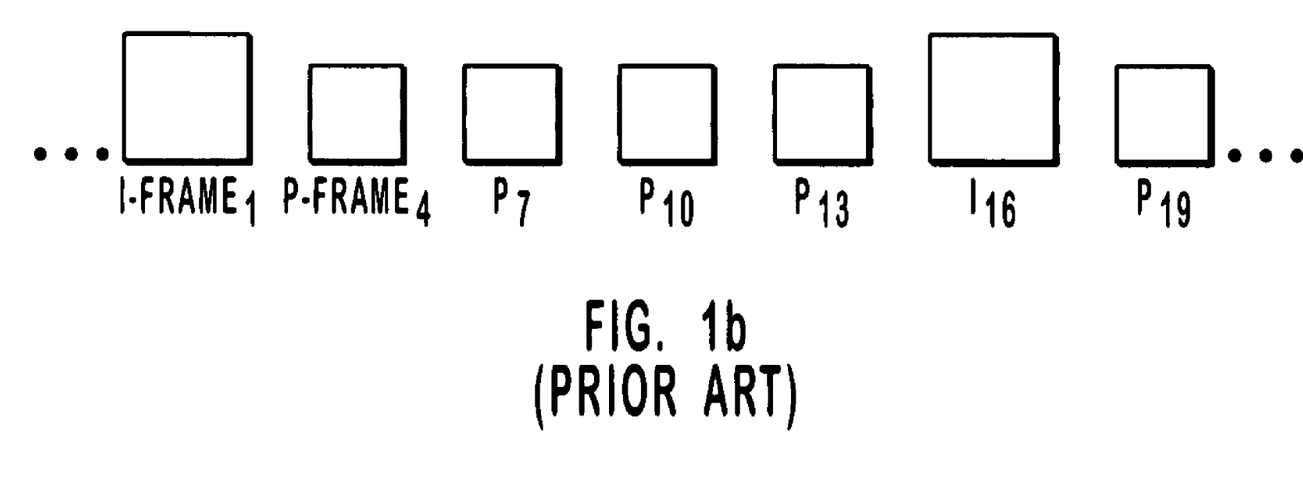

Digital video display systems may perform conventional fast-forwarding of a digital video stream using MPEG compression by displaying only the I-frames and P-frames. In the frame sequence in FIG. 1a, this would yield an increase in the playback rate by a factor of about 3 since there are typically two B-frames between each subsequent P-frame or between each I frame and its adjacent P-frames. FIG. 1b illustrates a digital video stream using MPEG compression where the playback rate is increased by a factor of three. Note that only 7 frames of the given sequence are displayed in FIG. 1b while 21 frames of the given sequence are displayed in FIG. 1a.

Figure 1C:
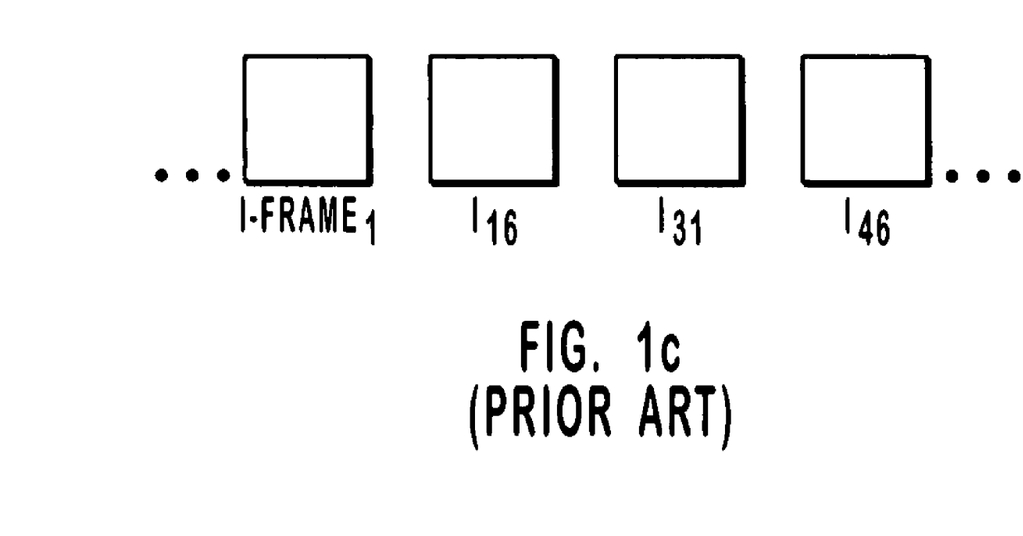

Digital video display systems might also perform fast-forwarding by displaying only the I-frame data, resulting in an increase in the playback rate by a factor of about 15. A video stream illustrating a 15 times increase in playback rate is shown in FIG. 1c. However, displaying only I-frames, which are relatively large, may exceed the processing capabilities of the display system, as well as make the displayed video stream appear choppy or discontinuous to a viewer.

Since conventional systems increase playback rate by not displaying one or more types of frame data, such as B-frame or P-frame or both, the speeds at which playback may occur are limited. In the frame sequence above, increases in the playback rate would be limited to either a factor of 3 or a factor of 15.

Another problem with conventional digital video playback using MPEG compression is the amount of frame buffering needed to play a digital video stream in reverse mode. This is primarily due to the temporal predictive techniques used to encode and decode P-frames. Since P-frames are predicted from preceding I-frames or P-frames in the video stream, simply reversing the playback sequence is not a viable solution. Reversing the video stream would create a situation were P-frames must be decoded but have no preceding I-frame or P-frame to refer back to.

To solve the problem, conventional playback methods buffer complete frame a sequences between adjacent independent frames, I-frames in the case of MPEG, in order to create all the needed frames before reverse mode is initiated. Once the complete frame sequence is buffered it may then be played in reverse mode. However, because all frames in a frame sequence are conventionally buffered, frame sequences of any substantial length require the use of memory resources that would otherwise be available to other parts included in a video playback system.

Another conventional method involves the use of trick mode sequences. A sequence of video frames is typically encoded using MPEG standards for playing the sequence in the forward temporal direction at a normal rate. The forward mode sequence may be decoded, and then re-encoded for playing the sequence in the reverse temporal direction. This re-encoded sequence is considered a reverse trick mode sequence and, when played back using an MPEG decoder, displays the video images in the reverse temporal direction.

The use of trick modes is advantageous in that the generation of the reverse trick mode may be accomplished without requiring any user intervention. Also, rewinding is relatively simple given the existence of the reverse trick mode sequence. Upon receiving a user command to reverse play, the system merely switches the video source from the forward mode sequence to the reverse trick mode sequence.

However, the user of trick modes requires the generation of a reverse trick mode sequence, which can take extensive processor resources. In addition, the reverse trick mode sequence may have high memory requirements. Accordingly, the use of trick modes may be undesirable in systems with relatively small processing and memory capabilities. Furthermore, the reverse trick mode video data is generated and stored prior to the time of playback at which point the need for the reverse trick mode video data is speculative. Thus, systems that use trick modes typically store, in addition to the normal mode video data, a large volume of trick mode data, much of which may never be used by the viewer.

Therefore, what are desired are systems and methods for playing stored digital data in reverse and fast-forward modes at various speeds, where the systems and methods also conserve resources of associated display systems. Also, what are desired are systems and methods for achieving reverse play of all the frames of digital video without having to use extensive processor and memory resources.

SUMMARY OF THE INVENTION

The principles of the present invention provide for the playing of stored digital video data in reverse and fast-forward modes at varying speeds. As an MPEG video stream is received, an index of the positions and sizes of the I-frames is generated. By placing or creating other types of frames between the indexed I-frames during playback, various playback speeds may be achieved. Using the index also eliminates the need to use extensive memory resources to buffer the digital video when playing the digital video in reverse mode.

In the fast-forward or fast-reverse modes, the I-frames are identified and selected by referencing the index. Depending on the desired playback rate, one or more blank P-frames (e.g., a P-frame indicating no change from the preceding I-frame or P-frame) are inserted between I-frames to reformat a video stream. There is no limitation on the selection of I-frames or number of inserted P-frames needed to reformat the video stream. As well as adjusting the playback speed, the inserted P-frames, which are relatively small compared to I-frames, reduce the bit rate of the video stream compared with playing back only I-frames. The reformatted stream is then decoded and played back on an associated display device in fast-forward or fast-reverse modes.

Since the frequency of I-frame selections from the index and the number of blank P-frames inserted between the I-frames is not fixed, varying playback rates may be achieved. Additionally, the reduced bit rate of the video stream conserves resources of associated display systems during decoding.

In another embodiment of the invention, MPEG video data can be replayed in reverse or slow-reverse mode. Reconstructing a reverse sequence of MPEG frames is conducted by first using the index to identify the two temporally adjacent I-frames that are positioned at the beginning and end of the sequence. In the sequence, the first I-frame is located temporally before the second I-frame. Using the first I-frame in the sequence, the intermediate P-frames can be reconstructed. Next, the second I-frame and the P-frame adjacent to the second I-frame are used to generate intermediate B-frames. Then the adjacent P-frame, the B-frames between the adjacent P-frame and the second I-frame, and the second I-frame are displayed in reverse order. After the B-frames are displayed they are no longer stored in memory.

If the system has insufficient resources to buffer all the intermediate P-frames, then the intermediate P-frames may be generated as needed by starting at the first I-frame and working forward in a similar manner each time a P-frame is needed. However, P-frames that are not immediately needed are discarded. Depending on the memory and processing resources available, a balance may be struck between buffering P-frames and generating P-frames as needed. For example, in a system that has high memory resources, but low processing resources, the system may keep in memory all intermediate P-frames calculated in order to derive a given intermediate P-frame. However, in a system that has low memory resources, the system may not keep these intermediate P-frames thus requiring more calculation and processing capability as P-frames are needed.

This process of B-frame generation is continued in an iterative manner that reconstructs only the minimum number of frames needed to play the reverse mode MPEG video stream. Using an iterative process to reconstruct frames for playback in reverse mode and then removing the frames from memory after they are displayed, is advantageous over conventional systems because memory storage buffers are not needed to buffer the complete frame sequence.

Additional features and advantages of the invention will be set forth in the description, which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and features of the invention are obtained, a more particular description of the invention briefly described above will be rendered by reference to specific embodiments thereof, which are illustrated, in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

The present invention extends to both methods and systems for playing compressed digital video in fast-forward and reverse modes at varying speeds. The embodiments of the present invention may comprise a special purpose or general-purpose processing device or computer including various computer hardware components, as discussed in greater detail below. The embodiments may further comprise multiple computers linked in a networked environment. Set top boxes that enhance the capabilities of conventional televisions represent an example of a special purpose computer.

Embodiments within the scope of the present invention also include computer-readable storage media for carrying or having computer-executable instructions or data structures stored thereon. Such computer-readable storage media can be any available storage media that can be accessed by a general purpose or special purpose computer. By way of example, and not limitation, such computer-readable storage media can comprise physical storage media such as RAM, ROM, EEPROM, CD-ROM or other optical disk storage, magnetic disk storage or other magnetic storage devices, or any other medium that can be used to carry or store desired program code means in the form of computer-executable instructions or data structures and that can be accessed by a general purpose or special purpose computer.

When information is transferred or provided over a network or another communications connection (either hardwired, wireless, or a combination of hardwired or wireless) to a computer, the computer properly views the connection as a computer-readable transmission medium. Combinations of the above should also be included within the scope of computer-readable media. Computer-executable instructions comprise, for example, instructions and data which cause a general purpose computer, special purpose computer, or special purpose processing device to perform a certain function or group functions.

The invention will be described in the general context of computer-executable instructions, such as program modules, being executed by set-top boxes or other computers. Generally, program modules include routines, programs, objects, components, data structures, etc. that perform particular tasks or implement particular abstract data types. The sequence of instructions implemented in a particular data structure or program module represents examples of corresponding acts for implementing the functions or steps described herein.

Figure 2:
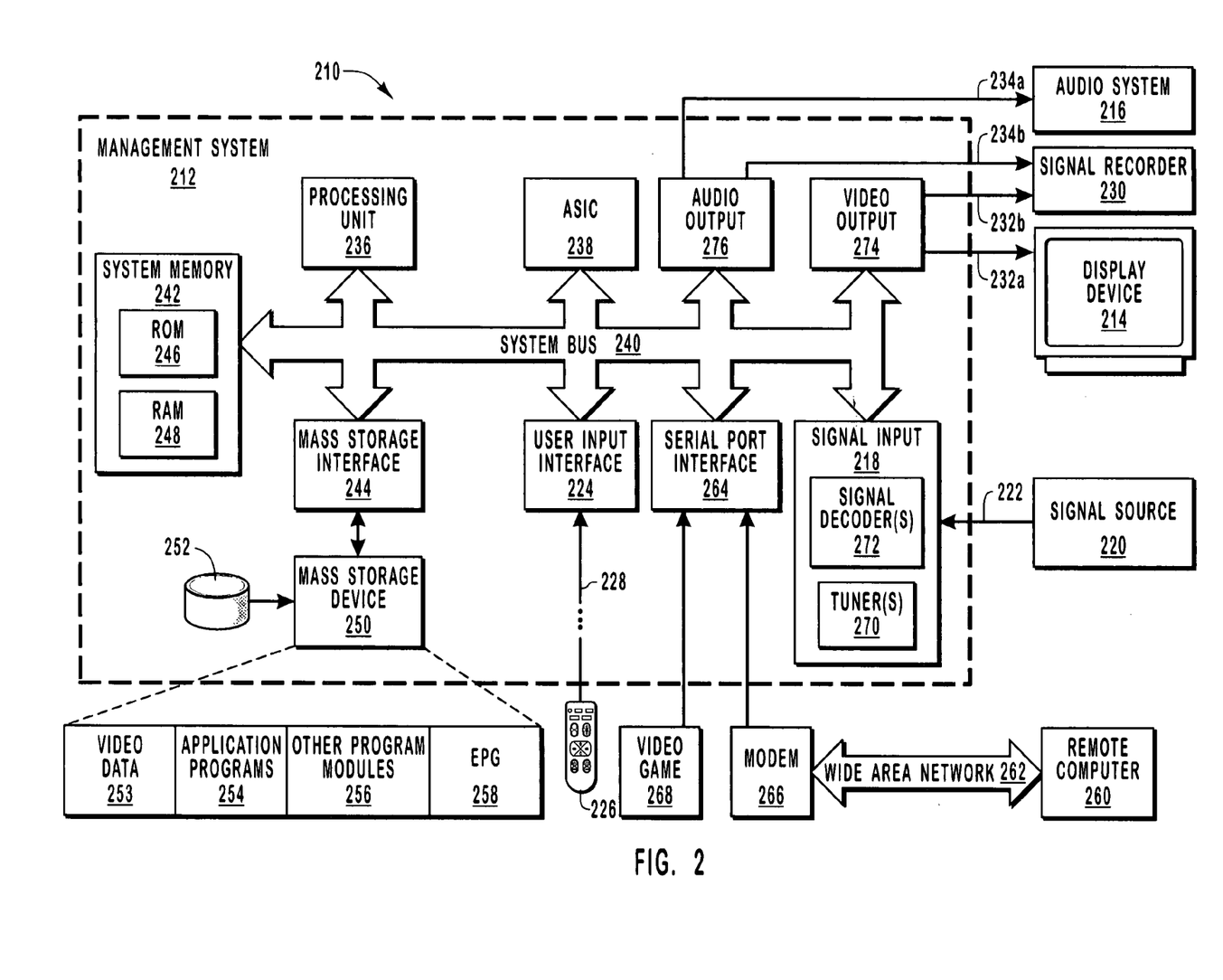
FIG. 2 illustrates an exemplary system that provides a suitable operating environment for the present invention.

FIG. 2 and the corresponding discussion are intended to provide a general description of a suitable environment in which the invention may be implemented. In the discussion, reference is made to a home entertainment system that may be used for displaying and/or recording programming. For purposes of this description and in the claims, a "home entertainment system" may be a display unit, such as a television screen, coupled to a processing device for performing the data processing steps disclosed herein, or may include any number of interconnected consumer electronic devices, one of which having a processing device for performing the data processing disclosed herein.

Examples of such consumer electronic devices include a video cassette recorder ("VCR"), a video game system, a stereo system, a television or monitor with data processing capabilities, a cable television box, a digital satellite system receiver ("DSS"), a digital video broadcasting system ("DVB"), a digital versatile disc system ("DVD"), a compact disk read-only memory system ("CD-ROM"), a set-top box that serves as an Internet terminal, and any other device capable of processing data as described herein. Furthermore, the term "home entertainment system" is to be understood as a term that broadly describes a television-viewing environment, whether it is located in a viewer's home, at a place of business, in the public, or at any other location. Also for purposes of this description and in the claims, the term "programming" includes both the viewable and non-viewable portions of moving image data and its associated sound data.

In one embodiment, the present invention is implemented in a system that uses a conventional television screen or other display unit to display information and includes a WebTV® set-top box or a similar Internet terminal that has been adapted to perform the operations that include composing, sending and receiving email, browsing the World Wide Web ("Web"), accessing other segments of the Internet, and otherwise displaying information. An Internet terminal may use standard telephone lines, Integrated Services Digital Network (ISDN) lines, cable lines associated with cable television service, or the like to connect to the Internet or other wide area networks.

FIG. 2 illustrates a home entertainment system 210 that includes a management system 212, a display device 214 and an audio system 216. Management system 212 may be a set-top box or Internet terminal that has been adapted to perform the operations disclosed herein. Management system 212 may be integrally positioned with or a separate from display device 214, which may be a high definition television display, a standard television display, a flat panel display, a projection device, an interface involving direct neural stimulation, a computer monitor, or any other device capable of displaying viewable video image data. Audio system 216 may be a speaker, a stereo system, or any device capable of emitting sound data, and similarly may be integrally positioned with or separate from display device 214.

Management system 212 includes a signal input 218, which receives programming from a signal source 220. The programming is transmitted from signal source 220 to signal input 218 via a programming input line 222, which can be a cable or optic connection, a terrestrial antenna system, a satellite system, or any device or system capable of transmitting programming to home management system 212.

The signal source 220 may be either a single channel signal source or a multiple channel signal source. A single channel signal source provides programming from a recorded medium, such as a videocassette, compact disc, etc. Examples of a single channel signal source include a VCR, a DVD, and the like. Alternatively, a multiple channel signal source includes any system or device that is capable of sending a signal that may be received by a satellite receiver, a cable or optic connection, a terrestrial antenna, or the like. Examples of a multiple channel signal source include DSS/DVB, a cable box, locally broadcast programming (i.e. programming broadcast using UHF or VHF), and the like.

While FIG. 2 illustrates home entertainment system 210 as having a single. programming input line 222 and a single signal source 220, there may also be a plurality of programming input lines that transmit programming from a plurality of signal sources. In such embodiments, the home entertainment system may receive the programming from one signal source or from a plurality of signal sources at a time.

Management system 212 also includes a user input interface 224, which it, receives input from an input device 226, such as a remote control, external special purpose or general-purpose processing device or computer, keyboard, microphone, mouse, or any other device capable of generating electronic instructions for management system 212. Input device 226 is communicatively coupled to management system 212 over an input link 228 so as to enable such control. Input device 226 generates electronic instructions over input link 228 in response to preprogrammed data or in response to a viewer pressing buttons on input device 226. Input device 226 may also control Web browser software within management system 212 as when management system 212 is a set-top box or an Internet terminal that has been adapted to perform the operations disclosed herein. For instance, input device 226 may be programmed to turn on home entertainment system 210 and to tune management system 212 to a channel.

FIG. 2 illustrates a signal recorder 230, which is capable of receiving video and/or audio data and recording the data on a storage medium. Video signals are transmitted to display device 214 and/or signal recorder 230 by video image links 232a and 232b respectively, examples of which include a radio-frequency ("RF") link, an S-video link, a composite link, or any other equivalent form of video image link. Similarly, audio links 234a and 234b transmit audio data from management system 212 to audio system 216 and/or to signal recorder 230.

The operation of management system 212 is controlled by a central processing unit ("CPU"), illustrated as processing unit 236, which is coupled to an application-specific integrated circuit ("ASIC") 238 via system bus 240 and uses computer-executable instructions implemented in software and/or hardwired logic circuitry. Processing unit 236 and ASIC 238 are also coupled via a system bus 240 to various other system components, including system memory 242, mass storage interface 244, user interface 224 and signal input 218. Processing unit 236 may execute software designed to implement features of management system 212 including features of the present invention.

ASIC 238 contains circuitry that is used to implement certain functions of management system 212. Instructions, data, and other program modules necessary for the operation of processing unit 236 and necessary for the operation of the ASIC 238 may be stored in mass storage device 250 and/or system memory 242, which includes read-only memory ("ROM") 246 and random-access memory ("RAM") 248. System memory 242 is coupled to system bus 240 and mass storage device 250 is coupled to mass storage interface 244, which is in turn also coupled to system bus 240. Thus, ROM 246, RAM 248 and mass storage device 250 are communicatively coupled to ASIC 238 so as to be readable by ASIC 238 and so that data may be written from ASIC 238 to RAM 248 and to mass storage device 250. Mass storage device 250 may be a magnetic hard disk 252, but may also be any of the other computer-readable media referenced above.

Any desired computer-readable instructions or data, including application programs 254, other program modules 256, and an electronic programming guide ("EPG") 258, which specifies the broadcast times and channels of programs can be stored in mass storage device 250.

Mass storage device 250 may also be used to record video data 253, in which case, management system 212 performs the functions of a digital video recorder. Digital video data may be received by home entertainment system 210 from a variety of sources including signal source 220, remote computer 260, video game 268, input device 226 and the Internet.

EPG data may be obtained in a variety of manners. For instance, the EPG data can be supplied to management system 212 by a remote computer 260, such as a server, or from devices on the Internet and stored on mass storage device 250. The EPG data may be supplied on a regular basis to continually maintain a current schedule of programming at the management system 212. Alternatively, the EPG may be delivered to home entertainment system 210 by using a direct-dial communication over standard telephone lines, or by using data transmission over the cable television infrastructure, a satellite network, an over-the-air broadcast or any other available medium, including those previously mentioned.

In the embodiment where management system 212 is associated with the Internet, management system 212 may communicate with remote computer 260 via wide area network ("WAN") 262 using a variety of techniques, including interposing serial port interface 264 between the system bus 240 and a modem 266, using a wireless link, or other means for establishing communications over a WAN that may be internal or external to management system 212. Management device 212 is also capable of transmitting information via the Internet by direct-dial communication over standard telephone lines, or by using any other available communication medium.

While serial port interface 264 may be utilized to connect a modem 266 for communicating across a WAN, serial port interface may also be utilized to connect other consumer electronic devices, such as video game 268, and/or various input devices, such as a keyboard (not shown) or joystick (not shown), to management device 212.

Referring now to signal input 218, if the signal on programming input line 222 includes multiple channels, a tuner 270 included in signal input 218 tunes to a selected channel in the signal. Multiple tuners 270 can be used to provide enhanced viewing features, such as picture-in-picture, recording one channel while viewing another, and recording a plurality of channels simultaneously. A signal decoder 272 may convert video data from an analog format to a digital format, from a digital format to an analog format, or convent between varying digital formats, in the event that ASIC 238 and tuner 270 employ different formats. Video decoder 272 may also decode video data from a compressed video format (e.g. MPEG). In embodiments where the management system 212 includes multiple tuners 270, management system 212 may also include multiple signal decoders 272 to perform the operations disclosed herein.

Management system 212 may also include video output 274, which may include a video converter that switches between analog and digital formats as necessary when providing video data over video links 232a and 232b. Similarly, audio output 276 can include an audio converter to provide the necessary switching between analog and digital formats across audio links 234a and 234b.

Figure 3:
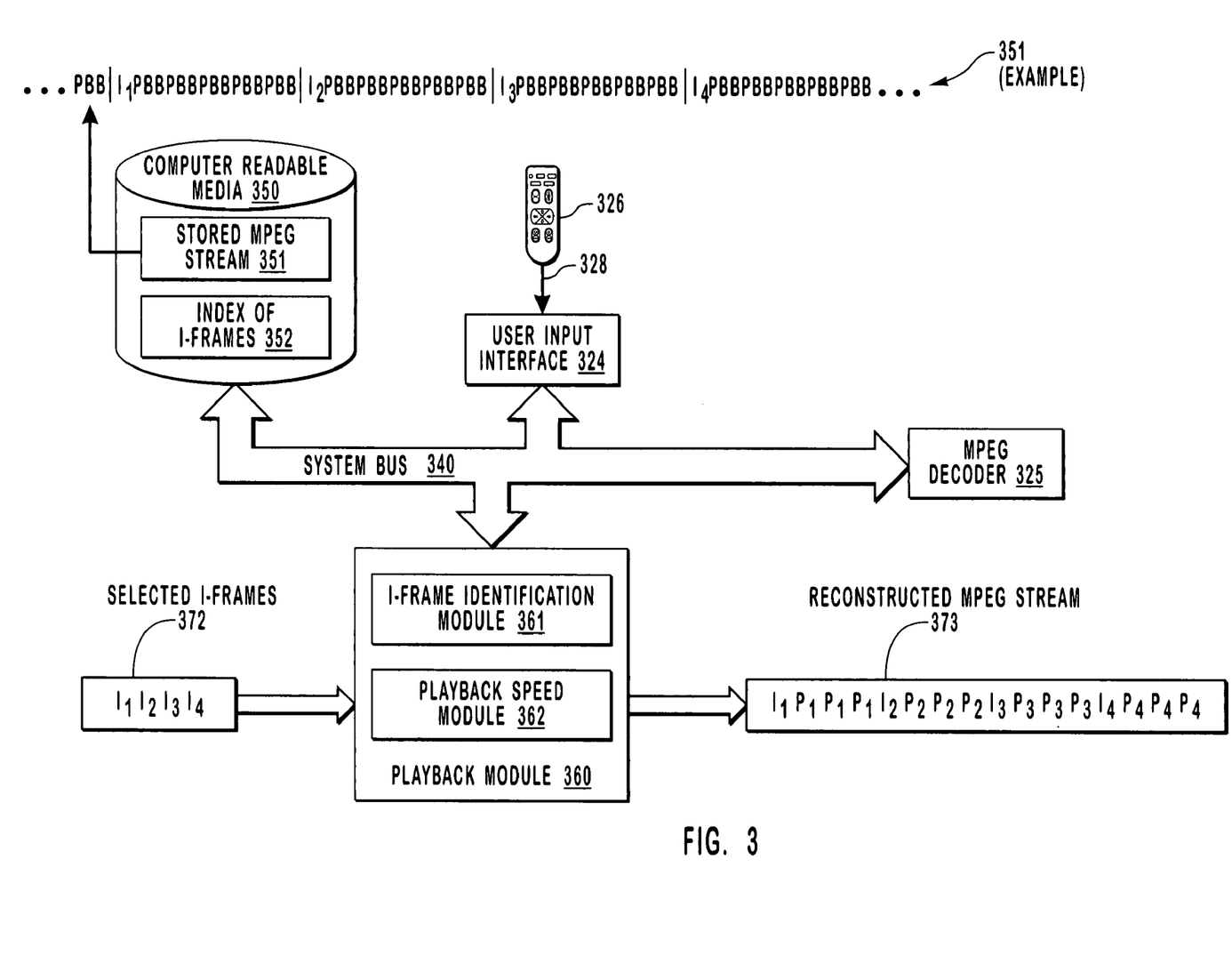
FIG. 3 illustrates some of the functional components present in a system that can play back a video stream in fast-forward and fast-reverse modes at varying speeds.

While FIG. 2 and the corresponding discussion above provide a general description of a suitable environment in which the invention may be implemented, it will be appreciated that the features of the present invention disclosed herein may be practiced in association with a variety of different system configurations. This is true of the functional components included in FIG. 3 as well. The functional components included in FIG. 3 illustrate only one example of the practice of the invention. It should be understood that the invention, as embodied in FIG. 3, might also be practiced in a configuration that additionally includes one or more of the components as illustrated in FIG. 2.

As illustrated in FIG. 3, user input interface 324, computer-readable media 350, playback module 360 and MPEG decoder 325 are coupled to each other via system bus 340. User input interface 324 may be configured like input interface 224 in FIG. 2. Likewise, system bus 340 may be configured like system bus 240 in FIG. 2. Computer-readable media 350 may be any type of mass storage device as illustrated by mass storage device 250 in FIG. 2, including hard disk 252.

Playback module 360 may be a software component, a hardware component, or a combination of software and hardware. However, for clarity, the playback module 360 will be discussed as being a software component or program module. This program module reconstructs a stored MPEG video stream to generate a specific playback rate and includes I-frame identification module 361 and playback speed module 362. Although I-frame identification module 361 and playback speed module 362 are shown as separate modules their functions may be combined in playback module 360 so as to be inseparably integrated. Additionally, while playback module 360 may be a separate module, it may also be included in other components, including audio output 276, video output 274, processing unit 236, ASIC 238, or any combination thereof as illustrated in FIG. 2.

MPEG decoder 325 may also be a program module, which may decode an MPEG video stream, including reconstructed MPEG stream 373. MPEG decoder 325 may also be a separate module, or it may be included as a functional component of audio output 276, video output 274, processing unit 236, ASIC 238, signal decoders 272 or any combination thereof.

Stored on computer-readable media 350 is data similar to video data 253. This data may include stored MPEG stream 351 and index of I-frames 352. Stored MPEG stream 351 is a series of MPEG frames previously stored on computer-readable media 350, which may include I-frames, P-frames, B-frames or combinations thereof. While stored MPEG stream 351 may have originally come from any of the input sources illustrated in reference to FIG. 2, the origination of stored MPEG stream 351 does not affect practice of the invention. Index of I-frames 352 includes the storage location and size of each I-frame in stored MPEG stream 351.

User input interface 324 receives input from input device 326 via input link 328. In turn, playback module 360 receives the user input from user input interface 324 via system bus 340. Input device 326 and input link 328 may be configured similarly to input device 226 and input link 228 as referenced in FIG. 2.

In the discussion of FIG. 3 and subsequent figures, reference may be made to "blank" frames. A "blank" frame in an MPEG stream simply refers to a frame that indicates no change from the preceding I-frame or P-frame. Such frames may typically be P-frames, which would display identically to their associated reference frame. However, practice of the invention is not limited to use "blank" P-frames, it may be the case that "blank" B-frames are used. Additionally, the terms P-frame and B-frame are typically associated with MPEG compression. The invention, while primarily described with respect to MPEG encoded video streams, may be practiced with any video stream where one or more frames depend on data in other frames to be properly displayed. In these instances the invention may be practiced using "blank" frames of an appropriate type.

In operation, playback module 360 would receive a command to fast-forward or reverse a stored MPEG stream, such as stored MPEG stream 351, at a specified playback rate. I-frame identification module 361 would receive from index of I-frames 352 the location of the I-frames needed for the specified playback command. Shown in FIG. 3 is selected I-frames 372, which is one example of I-frames that may be used to generate the specified playback rate. Selected I-frames 372 includes a series of four I-frames, which are some of the I-frames included in stored MPEG stream 351. In this example, the I-frames included in selected I-frames 372 are I-frames that would be chronologically adjacent, although they would typically have other P-frames and/or B-frames interspersed between them, in stored MPEG stream 351.

The current invention may be practiced with I-frames, P-frames and B-frames in the conventional frame sequence illustrated in FIG. 1 (e.g. IBBPBBPBBPBBPBB), which includes 14 frames between each I-frame. However, the invention may also be practiced with frame sequences other than the conventional frame sequence. FIG. 3 is an example of the practice of the invention where an alternative frame sequence is used. By way of example in FIG. 3, the frame sequence for stored MPEG stream 351 is illustrated as having fifteen frames between each I-frame (see 351 (example) shown above the computer-readable media 350).

These fifteen frames are composed of a combination of P-frames and B-frames. Play back of stored MPEG stream 351 at regular playback speed would thus result in one I-frame being displayed followed by fifteen frames composed of P-frames and B-frames, followed by the next chronological I-frame, and so forth. While the frame sequence for stored MPEG stream 351 is illustrated as a combination of fifteen frames interspersed between I-frames, this is not required.

If the command received by playback module 360 were to fast-forward stored MPEG stream 351 at four times the regular playback rate, playback speed module 362 would intersperse "blank" P-frames between the selected I-frames 372. To achieve the desired playback rate of four times the regular playback rate in this example, three blank P-frames may be inserted between each I-frame included in selected I-frames 372. The resulting MPEG stream, after the P-frame insertions, is reconstructed MPEG stream 373.

Reconstructed MPEG stream 373 includes three frames between each I-frame as opposed to the fifteen frames between each I-frame in stored MPEG stream 351. The reduction in the number of P-frames and B-frames between I-frames included stored MPEG stream 351 and reconstructed MPEG stream 373 results in an increase in playback rate by a factor of four. This is a result of each I-frame being followed by three frames (totaling four frames per sequence), as opposed to each I-frame being followed by fifteen frames, (totalling sixteen frames per sequence).

Figure 3A:
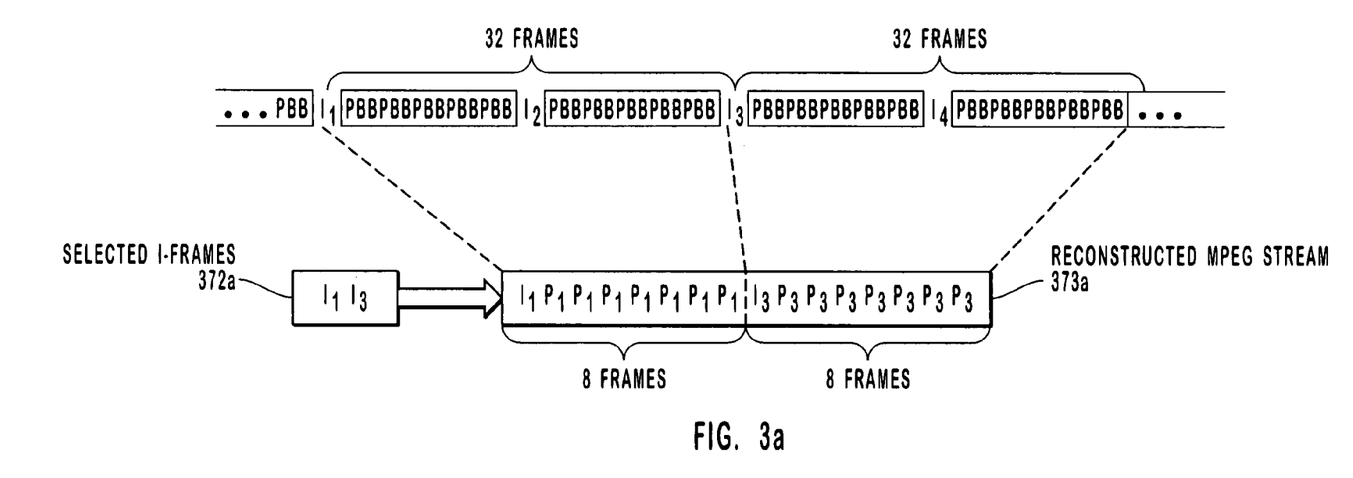

FIG. 3 illustrates one embodiment whereby temporally adjacent I-frames are used to generate selected I-frames 372. However, any combination of I-frames may be selected to generate a desired playback rate. For instance in FIG. 3a, selecting every other I-frame, such as I-frames $I_1$ and $I_3$, would generate selected I-frames 372a. In this case, inserting seven blank P-frames between each I-frame would also increase playback by a factor of four. Seven frames would be displayed with each I-frame (totalling eight frames), replacing the previous 32 frames.

Figure 3B:
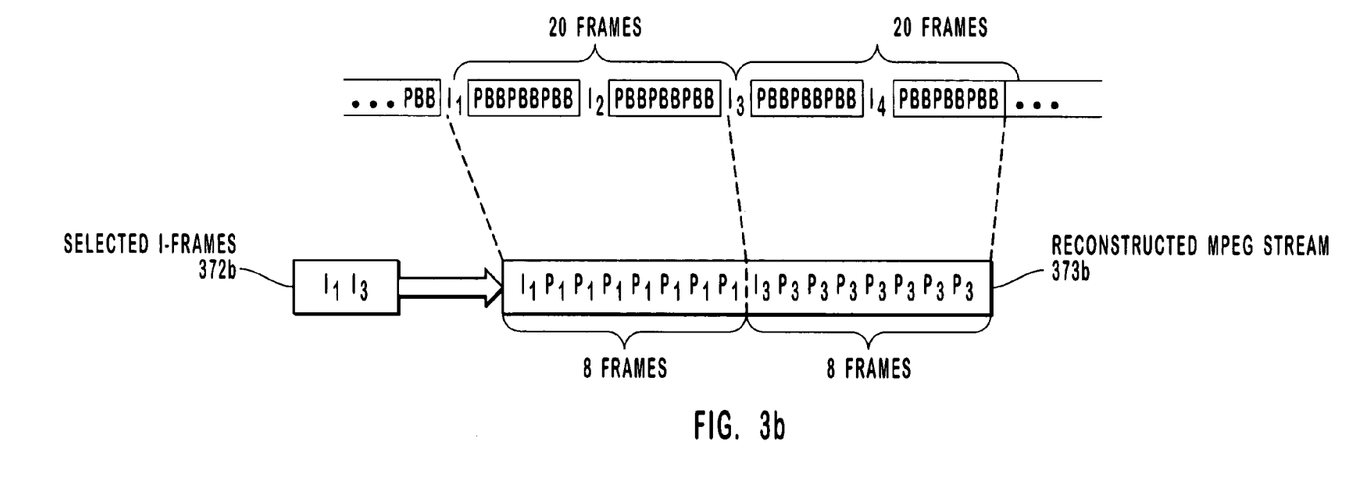

Selecting any combination of I-frames may also allow for increases in playback rates by fractional amounts, such as two and a half or three and a quarter. For example, in FIG. 3b, 9 frames follow each I-frame in the illustrated frame sequence. Selecting I-frames $I_1$ and $I_3$ would generate selected I-frames 372b. In this case inserting seven blank P-frames between each I-frame in I-frames 372b would result in an increased playback rate of two and a half. Seven frames would be displayed with both $I_1$ and $I_3$ (totalling sixteen frames) replacing the previous 40 frames.

Figure 4:
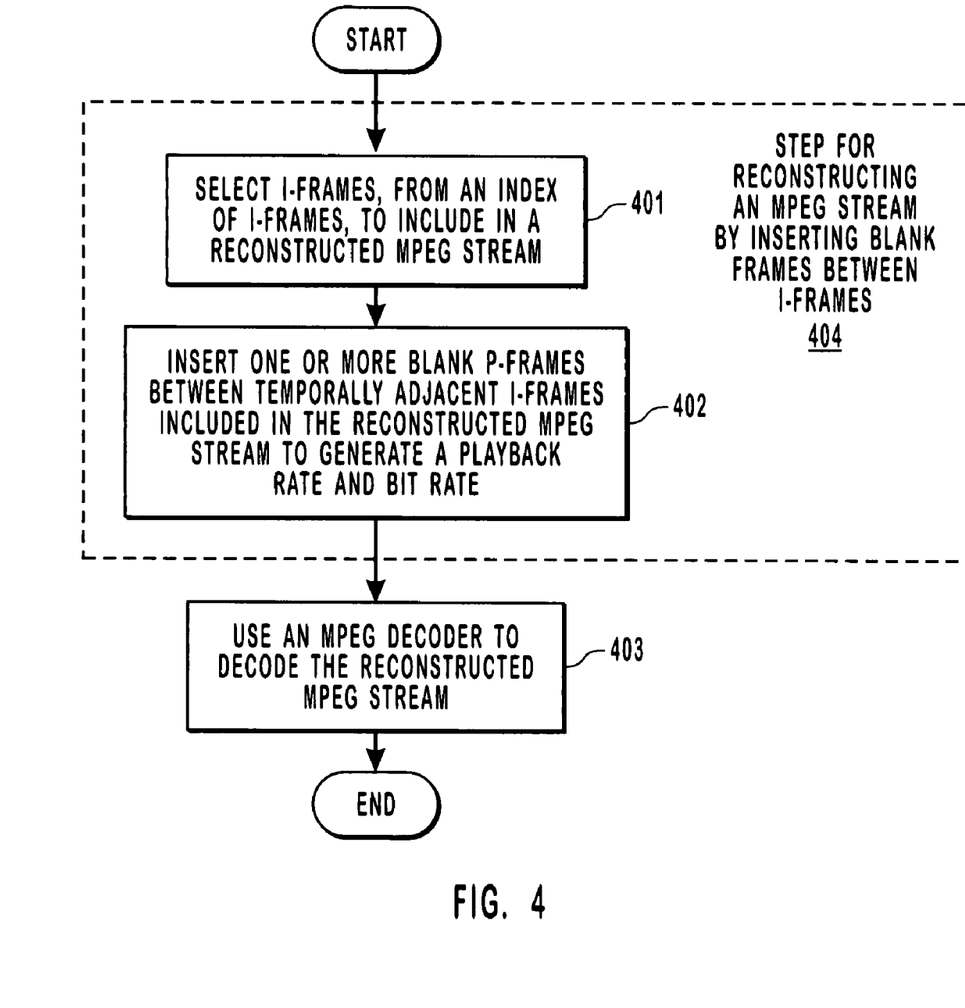
FIG. 4 is a flow diagram illustrating a method for reconstructing a video stream for playback at varying speeds.

The operation of the structure of FIG. 3 will now be described with respect to FIG. 4, which is a flowchart of a system operation when it determines that a video stream to be displayed at a certain playback rate. The system begins by performing a step for reconstructing an MPEG stream by inserting blank frames between larger I-frames (step 404). In one embodiment this may include selecting I-frames, from an I-frame index, to include in a reconstructed MPEG stream (act 401) and inserting one or more blank P-frames between the selected temporally adjacent I-frames to generate a playback rate and bit rate (act 402). After the MPEG stream is reconstructed, the method uses an MPEG decoder to decode the reconstructed MPEG stream (act 403).

Figure 5:
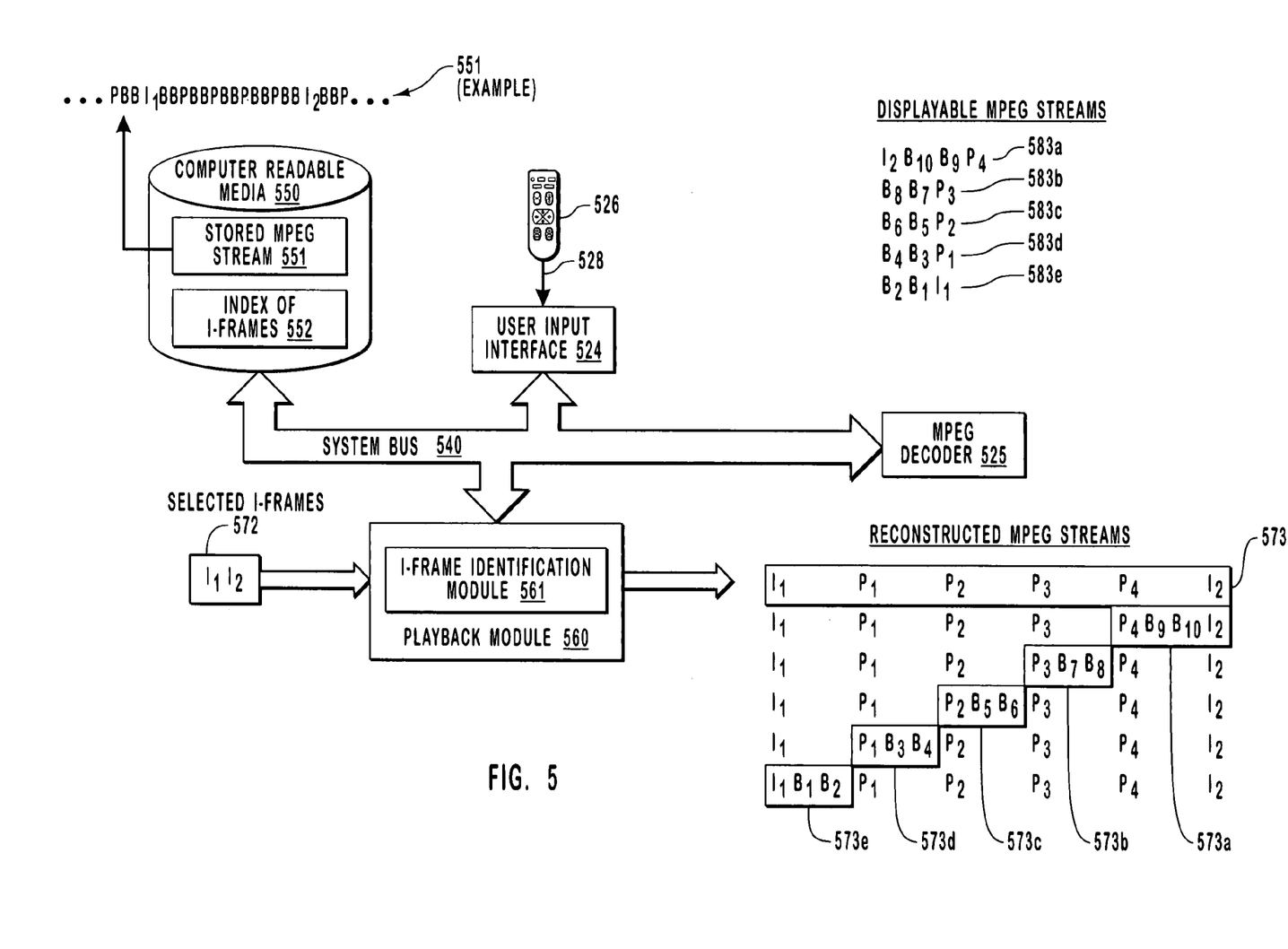
FIG. 5 illustrates some of the functional components present in a system that can play back a video stream in reverse mode.

FIG. 5 illustrates another embodiment of the present invention whereby an MPEG video stream may be played in reverse mode. The exemplary system in FIG. 5 includes user input interface 524, computer-readable media 550, playback module 560 and MPEG decoder 525 which are coupled to each other via system bus 540. User input interface 524 may be configured like input interface 224 in FIG. 2. Likewise, system bus 540 is configured similarly to system bus 240 in FIG. 2. Computer-readable media 550 may be any type of mass storage device as illustrated by mass storage device 250 in FIG. 2, including hard disk 252.

Playback module 560 is a program module that reconstructs a stored MPEG video stream to generate playback in reverse mode. Playback module 560 includes I-frame identification module 561. Although I-frame identification module 561 is shown as a separate module, the functions performed by I-frame identification module 561 may be combined with playback module 560. Additionally, while playback module 560 may be a separate module, it may also be included as a functional component of audio output 276, video output 274, processing unit 236, ASIC 238, or any combination thereof.

MPEG decoder 525 is also a program module, which may decode an MPEG video stream, including reconstructed MPEG streams 573, 573a, 573b, 573c, 573d, and 573e. MPEG decoder 575 may also be a separate module, or it may be included as a functional component of audio output 276, video output 274, processing unit 236, ASIC 238, signal decoders 272 or any combination thereof.

Stored on computer-readable media 550 is data similar to video data 253. This data may include stored MPEG stream 551 and index of I-frames 552. Stored MPEG stream 551 is a series of MPEG frames previously stored on computer-readable media 550, which may include I-frames, P-frames, B-frames or combinations thereof. While stored MPEG stream 551 may have originally come from any of the input sources illustrated in reference to FIG. 2, the origination of stored MPEG stream 551 does not affect practice of the invention. Index of I-frames 552 includes the storage location and size of each I-frame in stored MPEG stream 551.

User input interface 524 receives input from input device 526 via input link 528. In turn, playback module 560 receives user input from user input interface 524 via system bus 540. Input device 526 and input link 528 may be configured similarly to input device 226 and input link 228 as referenced in FIG. 2.

In operation, playback module 560 would receive a command to play an MPEG video stream, such as stored MPEG stream 551 or portions thereof, in reverse mode. I-frame identification module 561 would receive, from index of I-frames 552, the location of I-frames needed for the specified reverse mode command. Shown in FIG. 5 is selected I-frames 572, which is one example of I-frames that may be used to generate playback in reverse mode. Selected I-frames 572 includes two I-frames, $I_1$ and $I_2$, which are some of the I-frames included in stored MPEG stream 551. In this example, the I-frames included in selected I-frames 572 are chronologically adjacent, $I_2$ occurring temporally later then $I_1$, although the two I-frames have other P-frames and/or B-frames interspersed between them in stored MPEG stream 551.

By way of example in FIG. 5, stored MPEG stream 551 is illustrated as having fourteen frames between each I-frame. These fourteen frames are composed of a combination of P-frames and B-frames, generating the conventional frame sequence discussed in FIG. 1 (e.g. IBBPBBPBBPBBPBB). Play back of stored MPEG stream 551 in regular forward mode would thus result in one I-frame being displayed followed by the fourteen frames composed of P-frames and B-frames, followed by the next chronological I-frame, etc. While stored MPEG stream 551 is illustrated as a sequence of fourteen frames interspersed between I-frames, this is not required. The current invention may be practiced with I-frames, P-frames and B-frames in any sequence. For example, in addition to the conventional frame sequence, the invention may be practiced with the frame sequence as illustrated in FIG. 3, which includes fifteen frames between adjacent I-frames.

If the command received by playback module 560 were to play a portion of stored MPEG stream 551 in reverse mode, playback speed module 560 may iteratively generate the P-frames and B-frames between the I-frames of selected I-frames 572. To achieve playback in reverse mode in this instance, $I_1$ and the P-frames (i.e., $P_1$, $P_2$, $P_3$ and $P_4$) between $I_1$ and $I_2$ would be referenced in order to decode those P-frames to construct MPEG stream 573.

Referencing reconstructed MPEG stream 573, B-frames $B_9$ and $B_{10}$ would be decoded using frames $P_4$ and $I_2$ as reference frames. This would result in reconstructed MPEG stream 573a, which is shown in FIG. 5 as a subset of reconstructed MPEG stream 573. The four frames $P_4$, $B_9$, $B_{10}$ and $I_2$ may then be displayed in reverse order, such as the order illustrated by displayable MPEG stream 583a. After displaying stream 583a, frames $B_9$ and $B_{10}$ would no longer be stored in memory.

Next, in an iterative manner, reconstructed video streams 573b, 573c, 573d, and 573e would be decoded and displayed. Since each of the reconstructed MPEG streams, which are subsets of reconstructed MPEG stream 573, include two references frames, all intermediate B-frames may be properly generated. For, instance, $P_4$ and $P_3$ may be used to generated $B_7$ and $B_8$, etc. The resulting effect is that all frames between and including $I_1$ and $I_2$ are decoded for display in a reverse mode, yet it is not required to buffer intermediate B-frames after they are decoded.

In an alternative embodiment, P-frames are buffered only when they are needed to generate intermediate B-frames. This reduces the memory requirements by reducing the number of buffers needed to display in reverse order. However, as now described, reducing the number of buffers available increases processing requirements.

For example, suppose that there are only three buffers available to accomplish the reverse display of the reconstructed MPEG stream illustrated in FIG. 5. $I_2$ would be decompressed and buffered into one of the three buffers, and then displayed. $I_1$ is then decompressed and buffered into another of the three buffers. $I_1$ is then used as the reference frame to reconstruct $P_1$, which is stored in the last remaining buffer. At this stage, the buffer contents are $I_1$, $P_1$ and $I_2$. The buffer storing $I_1$ is then released. Then $P_1$ is used to reconstruct $P_2$, which is then buffered. At this stage, the buffer contents are $P_1$, $P_2$ and $I_2$. The buffer storing $P_1$ is then released. $P_2$ is then used to reconstruct $P_3$, which is then buffered. At this stage, the buffer contents are $P_2$, $P_3$ and $I_2$. The buffer storing $P_2$ is then released. $P_3$ is then used to reconstruct $P_4$, which is then buffered. At this stage, the buffer contents are $P_3$, $P_4$ and $I_2$. The buffer storing $P_3$ is then released leaving one free buffer. $P_4$ and $I_2$ are then used as the reference frames for reconstructing $B_9$ and $B_{10}$. One at a time, each of these B-frames is reconstructed, buffered using the one free buffer, displayed, and then unbuffered. Then, $P_4$ is displayed and $I_2$ is released. At this stage, only one of the three buffers is used storing $P_4$. In this manner, $P_4$, $B_9$ and $B_{10}$ may be reconstructed and displayed in reverse order using only three buffers.

This method may be repeated for each set of three frames in reverse order, except that the latest reconstructed P-frame would take the place of $I_2$. For example, to reconstruct $P_3$, $B_7$ and $B_8$, $P_4$ would take the place of $I_2$ and $P_3$ would be reconstructed as described above. To reconstruct $P_2$, $B_5$ and $B_6$, $P_3$ would take the place of $P_4$ and $P_2$ would be reconstructed as described above. To reconstruct $P_1$, $B_3$ and $B_4$, $P_2$ would take the place of $P_3$ and $P_1$ would be reconstructed as described above.

Note that for each set of three frames, a P-frame needs to be recalculated since there are only three buffers available. Thus, although the three buffer model for reverse play results in few buffers, the processing requirements are quite high. This alternative embodiment may be used on systems having reduced memory buffer resources, since fewer frames are buffered simultaneously. However, when memory resources are high, the embodiment where all P-frames are buffered may be preferred. It may also be the case, depending on the speed of the decoding hardware and the amount of available memory buffers, that a hybrid of the two embodiments is used. This may involve buffering more than three, but not all P-frames simultaneously.

For example, suppose a hybrid approach in which there are five buffers available for storing uncompressed I-frames or P-frames. Three of the buffers are referred to as "needed" buffers since a minimum of three buffers is needed to perform the reverse play described above. The other two buffers are referred to as "spare" buffers since they are not strictly necessary to perform reverse play, but are helpful when reducing processing requirements for performing reverse play.

Referring to the example in FIG. 5, $I_2$ would be decompressed, buffered in the first of the three needed buffers, and then displayed. At this stage, a given process now described may be performed for each successive group of three frames in reverse order. However, the precise method performed depends on whether or not there are any frames stored in the spare buffers that are temporally earlier than the temporally latest frame stored in the needed buffers. At this stage, all of the spare buffers are empty. Therefore, there are no frames stored in the spare buffers that are temporally earlier than the temporally latest frame stored in the needed buffers. In this case, in order to reconstruct the next three frames in reverse order (i.e., $P_4$, $B_9$ and $B_{10}$ at this stage), the following specific method is followed.

The temporally latest frame stored in a spare buffer would then be copied into one of the needed buffers. However, as in this case, if there are no frames stored in a spare buffer, then $I_1$ would then be decompressed and buffered in one of the needed buffers (the second of the three needed buffers at this stage). $P_1$ is then reconstructed based on $I_1$ and then buffered in the last of the three needed buffers. At this stage, the needed buffers store $I_1$, $P_1$ and $I_2$. The spare buffers are still empty.

It is then determined whether the just reconstructed P-frame (i.e., $P_1$ in this case) should be copied into a spare buffer. The just reconstructed P-frame is copied into a spare buffer if either of the following two conditions are true:
1) the just reconstructed P-frame is at least $1/(n+1)$th of the way from the temporally latest frame stored in a spare buffer (or if there is no frame stored in the spare frames, then from $I_1$ to the temporally last frame stored in the needed buffer, where "n" is equal to the number of spare buffers that are currently unused; or
2) there is only one P-frame between the just reconstructed P-frame and the temporally last frame stored in the needed buffers.

This test will be referred to as the "backup" test. At this stage, the just reconstructed P-frame is $P_1$, "n" is two since there are two spare buffers in the five buffer model and neither spare buffer is currently being used, and the temporally last frame stored in the needed buffers is $I_2$. Thus, using the values that apply at this stage, condition 1 of the backup test simplifies to whether $P_1$ is at least ⅓ of the way from $I_1$ to $I_2$. Referring to stream 573 of FIG. 5, $P_1$ is only ⅕ of the way from $I_1$ to $I_2$, thus condition 1 of the backup test is false at this stage. Condition 2 of the backup test is also false since there is more than one P-frame (i.e., $P_2$, $P_3$, and $P_4$) between $P_1$ and $I_2$. Since the backup test failed, $P_1$ is not backed up into a spare buffer. The needed buffer that stores $I_1$ is then released. At this stage, the needed buffers hold $P_1$ and $I_2$ with one needed buffer being free. The spare buffers are still empty.

$P_1$ is then used to reconstruct $P_2$, which is then buffered in the last remaining needed buffer. Then the backup test is performed for $P_2$. At this stage, the current parameter values relevant for the backup test are as follows: the just reconstructed P-frame is $P_2$, "n" is still two since neither spare buffer is currently being used, and the temporally last frame stored in the needed buffers is $I_2$. Thus, using the values that apply at this stage, condition 1 of the backup test simplifies to whether $P_2$ is at least ⅓ of the way from $I_1$ to $I_2$. Referring to stream 573 of FIG. 5, $P_2$ is ⅖ of the way from $I_1$ to $I_2$, thus condition 1 of the backup test is true at this stage and the backup test provides that $P_2$ is to be copied into a spare buffer. The needed buffer that stores $P_1$ is then released. At this stage, the needed buffers store $P_2$ and $I_2$ with one needed buffer being free. The spare buffers hold $P_2$ with one spare buffer being free.

$P_2$ is then used to reconstruct $P_3$, which is then buffered in the last remaining needed buffer. Then the backup test is performed for $P_3$. At this stage, the current parameter values relevant for the backup test are as follows: the just reconstructed P-frame is $P_3$, "n" is one since one of the two spare buffers is used, the temporally latest frame stored in a spare buffer is $P_2$, and the temporally last frame stored in the needed buffers is $I_2$. Thus, using the values that apply at this stage, condition 1 of the backup test simplifies to whether $P_3$ is at least ½ of the way from $P_2$ to $I_2$. Referring to stream 573 of FIG. 5, $P_3$ is only ⅓ of the way from $P_2$ to $I_2$, thus condition 1 of the backup test is false at this stage. However, condition 2 of the backup test is true since there is only one P-frame (i.e., $P_4$) between $P_3$ and $I_2$. Therefore backup test provides that $P_3$ is to be copied into a spare buffer. The needed buffer that stores $P_2$ is then released. At this stage, the needed buffers store $P_3$ and $I_2$ with one needed buffer being free. The spare buffers store $P_2$ and $P_3$.

$P_3$ is then used to reconstruct $P_4$, which is then buffered in the last remaining needed buffer. The needed buffer that holds $P_3$ is then released. The backup test is not performed if the newly reconstructed P-frame (i.e., $P_4$ in this case) is the immediately preceding frame for the temporally latest P-frame or I-frame stored in the needed buffers ($I_2$ in this case). Instead, the B-frames between the newly reconstructed frame and temporally latest P-frame or I-frame stored in the needed buffers are, one at a time, reconstructed, buffered in the last free needed buffer, displayed, and then the needed buffer is released. In this case, $P_4$ and $I_2$ are used to reconstruct $B_9$ and $B_{10}$. In this manner, $P_4$, $B_9$ and $B_{10}$ may be displayed in reverse order using five buffers. The needed buffer that stores $I_2$ is then released. At this stage, the needed buffers store only $P_4$ with two needed buffers being free. Also, the spare buffers store $P_2$ and $P_3$. The temporally latest frame in the spare buffers is then checked to see if it is the same as the only frame in the needed buffers. If they are the same, then the temporally latest frame in the spare buffers is removed. Since $P_3$ is not the same as $P_4$, $P_3$ is not removed from the spare buffers.

For the next set of three frames in reverse order, namely, $P_3$, $B_7$ and $B_8$, there are already frames stored in the spare buffers (i.e., $P_2$ and $P_3$ at this stage) that are temporally earlier than the temporally latest frame stored in the needed buffers (i.e., $P_4$ at this stage). At this point, the latest frame in the spare buffers is utilized to reduce the amount of processing needed to obtain $B_7$ and $B_8$. This will be termed the low processing method.

Specifically, the temporally latest frame in the spare buffers is copied into a needed buffer. At this stage, the temporally latest frame in the needed buffer is $P_4$ (recall that $I_2$ has been released). The temporally latest frame in the spare buffer is $P_3$. Thus, $P_3$ is copied into a needed buffer. Thus, at this stage, the needed buffers store $P_3$ and $P_4$ with one needed buffer being free. The spare buffers still store $P_2$ and $P_3$. The B-frames between the newly copied P-frame (i.e., $P_3$) and temporally latest P-frame or I-frame stored in the needed buffers (i.e., $P_4$) are, one at a time, reconstructed, buffered in the last free needed buffer, displayed, and then the needed buffer is released. In this case, $P_3$ and $P_4$ are used to reconstruct $B_7$ and $B_8$. In this manner, $P_3$, $B_7$ and $B_8$ may be displayed in reverse order using five buffers. The needed buffer that stores $P_4$ is then released. Note that in order to obtain $P_3$, no recalculation was needed thus reducing the processing requirements as compared to a strict three buffer model. At this stage, the needed buffers only store $P_3$ while two needed buffers are empty. Also, the spare buffers still store $P_2$ and $P_3$. The temporally latest frame in the spare buffers is then checked to see if it is the same as the only frame in the needed buffer. If it is, then temporally latest frame in the spare buffers is removed. In this case, $P_3$ is the temporally latest frame in the spare buffers and is the same as the only frame in the needed buffers. Accordingly, $P_3$ is removed from the spare buffers. Thus, the needed buffers only store $P_3$ while two needed buffers are empty. The spare buffers only store $P_2$ with one spare buffer being free.

For the next set of three frames in reverse order, namely, $P_2$, $B_5$ and $B_6$, there is still a frame stored in the spare buffers (i.e., $P_2$ at this stage) that is temporally earlier than the temporally latest frame stored in the needed buffers (i.e., $P_3$ at this stage). Therefore, the low processing method is again followed.

Specifically, the temporally latest frame in the spare buffers (i.e., $P_2$) is copied into a needed buffer. Thus, at this stage, the needed buffers store $P_2$ and $P_3$ with one needed buffer being free. The spare buffers store $P_2$ with one spare buffer being free. The B-frames between the newly copied P-frame (i.e., $P_2$) and temporally latest P-frame or I-frame stored in the needed buffers (i.e., $P_3$) are, one at a time, reconstructed, buffered in the last free needed buffer, displayed, and then the needed buffer is released. In this case, $P_2$ and $P_3$ are used to reconstruct $B_5$ and $B_6$. In this manner, $P_2$, $B_5$ and $B_6$ may be displayed in reverse order using five buffers. The needed buffer that stores $P_3$ is then released. Like obtaining $P_3$, in order to obtain $P_2$, no recalculation was needed thus reducing the processing requirements as compared to a strict three buffer model. At this stage, the needed buffers only store $P_2$ with two needed buffers being empty. The spare buffers store $P_2$ with one spare buffer being free. The temporally latest frame in the spare buffer is then checked to see if it is the same as the only frame in the needed buffers. Since it is, the temporally latest frame in the spare buffers (i.e., $P_2$) is removed from the spare buffers. Thus, at this stage, the needed buffers store $P_2$ with two needed buffers being free. All two spare buffers are also free.

For the next set of three frames in reverse order, $P_1$, $B_3$ and $B_4$, there are no frames in the spare buffers. Thus, $I_1$ and $P_1$ are decoded as described above using the needed buffers. Because there are few P-frame in between $I_1$ and $P_2$, no P-frames are stored in the spare buffers for later use, but those skilled in the art will recognize that in an example of a larger number of P-frames between $I_1$ and $I_2$ or fewer spare buffers, a given spare buffer may be used multiple times for the buffering of multiple different P-frames in displaying from $I_2$ to $I_1$ in reverse order. When a spare frame becomes unused because its frame has already been displayed, that buffer becomes free and able to buffer a different P-frame that will be used again at a later time. Since there are no frames in the spare buffers, the higher processing method is followed as described above.

Specifically, $I_1$ would be decompressed and buffered in the second of the three needed buffers. $P_1$ is then reconstructed based on $I_1$ and then buffered in the last of the three needed buffers. At this stage, the needed buffers store $I_1$, $P_1$ and $P_2$. The needed buffer that holds $I_1$ is then released. The backup test is not performed if the newly reconstructed P-frame (i.e., $P_1$ in this case) is the immediately preceding P-frame for the temporally latest P-frame or I-frame stored in the needed buffers ($P_2$ in this case). Instead, the B-frames between the newly reconstructed P-frame and temporally latest P-frame or I-frame stored in the needed buffers are, one at a time, reconstructed, buffered in the last free needed buffer, displayed, and then the needed buffer is released. In this case, $P_1$ and $P_2$ are Fused to reconstruct $B_3$ and $B_4$. In this manner, $P_1$, $B_3$ and $B_4$ may be displayed in reverse order. The needed buffer that stores $P_2$ is then released. At this stage, the needed buffers store only $P_1$ with two needed buffers being free. For the next set of three frames in reverse order, $I_1$, $B_1$ and $B_2$, there are still no frames in the spare buffers. Therefore, the higher processing method is followed as described above.

Specifically, $I_1$ would be decompressed and buffered in the second of the three needed buffers. At this stage, the needed buffers store $I_1$ and $P_1$. The B-frames between the newly reconstructed I-frame or P-frame and temporally latest P-frame in the needed buffers are, one at a time, reconstructed, buffered in the last free needed buffer, displayed, and then the needed buffer is released. In this case, $I_1$ and $P_1$ are used to reconstruct $B_1$ and $B_2$. In this manner, $I_1$, $B_1$ and $B_2$ may be displayed in reverse order.

In one optimization, $I_1$ may be stored in a spare buffer rather than being released as it was described above after having last reconstructed $P_1$. This would allow for the last high processing method performed for $I_1$, $B_1$ and $B_2$ to be replaced by the low processing method. While FIG. 5 depicts a reverse mode operation involving only two I-frames, the invention can be practiced using any number of temporally adjacent I-frames. Other temporally adjacent I-frames, either before $I_1$ or after $I_2$ in stored MPEG stream 351, may be used as reference frames to generate intermediate P-frames and B-frames for display in reverse mode.

The above describes three different models of reverse play. The first described model will be called an "all P-frames" model since all P-frames are simultaneously buffered. The second described model will be called a "three frames" model since a maximum number of three buffers is used. The third described model will be called the "hybrid" model in which there are more than three buffers used, but less than enough to simultaneously buffer all P-frames.

Figure 6:
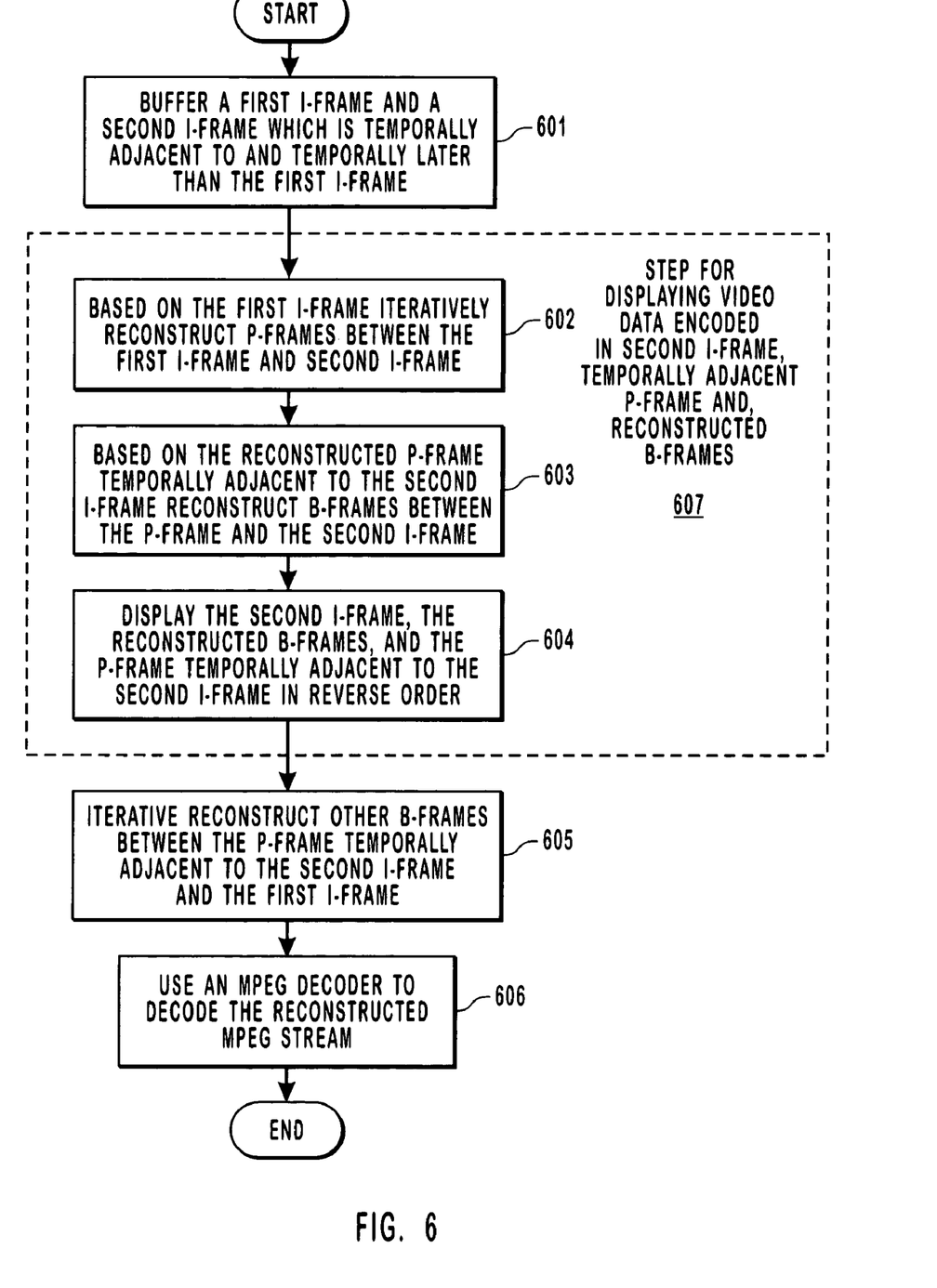
FIG. 6 is a flow diagram illustrating a method for playing a video stream in reverse mode.

The operation of the structure of FIG. 5 will now be described with respect to FIG. 6, which is a flowchart of a system operation when it determines that a video stream is to be displayed in reverse mode. The system begins by performing the act of buffering a first I-frame and a second I-frame where the second I-frame is temporally adjacent and temporally later than the first I-frame (act 601).

The system may then perform a step for displaying video data encoded in the second I-frame, a P-frame temporally adjacent to the second I-frame and reconstructed B-frames between the second I-frame and the temporally adjacent P-frame (step 607). In one embodiment, this may include using the first I-frame to iteratively reconstruct P-frames between the first I-frame and second I-frame (act 602), reconstructing B-frames between the second I-frame and the P-frame temporally adjacent to the second I-frame (act 603), and displaying the second I-frame, the temporally adjacent P-frame and reconstructed B-frames in reverse order (act 604). Note that although the first I-frame and interceding P-frames are used to reconstruct the P-frame adjacent to the second I-frame, whether or not and how many of the interceding P-frames are buffered depends on whether the "all P-frames" model, the "three frames" model, or the "hybrid" model is followed as described above.

Next, the system may iteratively reconstruct other B-frames between the first I-frame and the P-frame temporally adjacent to the second I-frame (act 605) and display the frames in reverse order without simultaneously buffering all the B-frames (act 606) as explained above with reference to FIG. 5.

Thus the present invention allows for fast-forward and fast-rewind playback speeds that are not limited to those speeds obtained by simply dropping one or more types of frames. By selecting a sequence of I-frames and inserting a number of P-frames between the I-frames a wide range of previously unobtainable playback rates may be achieved. Additionally, by using blank P-frames, or other types of intracoded frames, the bit rate being output to associated hardware components is reduced because intracoded frames are typically smaller in size then intercoded frames. This frees up resources for use in other operations.

Playback in slow reverse mode may also be achieved in a manner that conserves memory resources of associated playback systems. This is done by iteratively selecting certain frames at a time that are needed for a given playback sequence and discarding the frames once they are displayed. Since the frames are discarded once they are displayed less memory buffering space is used to perform the reverse mode operation. In addition, a number of rewind models have been described that allow for a flexible balance between memory resources and processing resources when performing slow rewind.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed is:

1. In a system that includes an MPEG decoder and has access to a stored MPEG stream, a method for displaying a reconstructed MPEG stream based on the stored MPEG stream in an accelerated speed in a forward or reverse mode, comprising:

receive a command for playing back a stored MPEG stream at a specified playback rate in either a forward or reverse mode, the specified playback rate comprising only one of a plurality of different playback rates that are available by a playback module of the system for playing back the stored MPEG stream;

an act of identifying, from an index of I-frames of the stored MPEG stream, a selected number of the I-frames to be included in a reconstructed MPEG stream having the specified playback rate, and wherein at least one playback rate that is available by the playback module will result in less than all of the I-frames being selected for playback, with at least one or more of the indexed I-frames being skipped between the selected I-frames;

an act of generating the reconstructed MPEG stream by including the selected I-frames in the reconstructed MPEG stream and inserting one or more blank predictive frames between the selected I-frames, wherein the selected I-frames and the blank predictive frames that are included in the reconstructed MPEG stream are selected to generate the specified playback rate of the stored MPEG stream as the reconstructed MPEG stream; and an act of decoding the reconstructed MPEG stream using the MPEG decoder for display on a display device associated with the system at the specified playback rate.

2. The method as recited in claim 1, wherein the stored MPEG stream includes a set of temporally adjacent frames in the sequence I-frame, B-frame, B-frame, P-frame, B-frame, B-frame, P-frame, B-frame, B-frame, P-frame, B-frame, B-frame, P-frame, B-frame, B-frame.

3. The method as recited in claim 1, wherein the stored MPEG stream includes a repeating frame sequence, wherein the frame sequence is a set of temporally adjacent frames in the sequence I-frame, B-frame, B-frame, P-frame, B-frame, B-frame, P-frame, B-frame, B-frame, P-frame, B-frame, B-frame, P-frame, B-frame, B-frame, and wherein the frame sequence repeats one or more times.

4. The method as recited in claim 1, wherein the system comprises a home entertainment system.

5. The method as recited in claim 4, wherein the home entertainment system is associated with a computer network.

6. The method as recited in claim 1, where I-frames selected for the reconstructed MPEG stream are temporally adjacent I-frames in the stored MPEG stream.

7. The method as recited in claim 1, wherein the act of identifying I-frames of the stored MPEG stream comprises skipping one or more I-frames after each selected I-frame.

8. The method as recited in claim 1, wherein the act of generating the reconstructed MPEG stream comprises inserting one blank P-frame between each of the selected I-frames.

9. The method as recited in claim 1, wherein the act of generating the reconstructed MPEG stream comprises inserting two or more blank P-frames between each of the selected I-frames.

10. The method as recited in claim 1, wherein a blank B-frame is inserted between each of the selected I-frames.

11. The method as recited in claim 10, wherein the blank B-frames are also used to generate the playback rate.

12. A computer program product for implementing, in a system that includes an MPEG decoder and has access to a stored MPEG stream, a method for displaying a reconstructed MPEG stream based on the stored MPEG stream in an accelerated speed in a forward or reverse mode, the computer program product comprising:

a computer-readable storage medium carrying computer-readable instructions, that when executed at the server system, cause the system to perform the following:

receiving a command for playing back a stored MPEG stream at a specified playback rate in either a forward or reverse mode, the specified playback rate comprising only one of a plurality of different playback rates that are available by a playback module of the system for playing back the stored MPEG stream;

an act of identifying, from an index of I-frames of the stored MPEG stream, a selected number of the I-frames to be included in a reconstructed MPEG stream having the specified playback rate, and wherein at least one playback rate that is available by the playback module will result in less than all of the I-frames being selected for playback, with at least one or more of the indexed I-frames being skipped between the selected I-frames;

an act of generating the reconstructed MPEG stream by including the selected I-frames in the reconstructed MPEG stream and inserting one or more blank predictive frames between the selected I-frames, wherein the selected I-frames and the blank predictive frames that are included in the reconstructed MPEG stream are selected to generate the specified playback rate of the stored MPEG stream as the reconstructed MPEG stream; and an act of decoding the reconstructed MPEG stream using the MPEG decoder for display on a display device associated with the system at the specified playback rate.

13. The computer program product as recited in claim 12, wherein the computer-readable medium comprises one or more physical storage media.

14. The method recited in claim 9, wherein the act of generating the reconstructed MPEG stream comprises inserting at least 3 blank P-frames between each of the selected I-frames.

15. The computer program product recited in claim 12, wherein the act of generating the reconstructed MPEG stream comprises inserting at least 7 blank P-frames between each of the selected I-frames.

16. A computing system comprising a processor and storage media storing computer-executable instructions for implementing the method recited in claim 1.

* * * * *